US012221808B2

(12) United States Patent
Banse

(10) Patent No.: US 12,221,808 B2
(45) Date of Patent: Feb. 11, 2025

(54) MOBILE LOCK

(71) Applicant: ABUS August Bremicker Söhne KG, Wetter-Volmarstein (DE)

(72) Inventor: Manuel Banse, Herborn (DE)

(73) Assignee: ABUS August Bremicker Söhne KG, Wetter-Volmarstein (DE)

( * ) Notice: Subject to any disclaimer, the term of this patent is extended or adjusted under 35 U.S.C. 154(b) by 349 days.

(21) Appl. No.: 17/611,678

(22) PCT Filed: May 11, 2020

(86) PCT No.: PCT/EP2020/063007

§ 371 (c)(1),
(2) Date: Nov. 16, 2021

(87) PCT Pub. No.: WO2020/234019

PCT Pub. Date: Nov. 26, 2020

(65) Prior Publication Data

US 2022/0220774 A1 Jul. 14, 2022

(30) Foreign Application Priority Data

May 17, 2019 (DE) ......................... 102019113163.4

(51) Int. Cl.
*E05B 47/00* (2006.01)
*E05B 45/06* (2006.01)
*E05B 45/00* (2006.01)

(52) U.S. Cl.
CPC .......... *E05B 47/0012* (2013.01); *E05B 45/06* (2013.01); *E05B 45/005* (2013.01); *E05B 2047/0069* (2013.01)

(58) Field of Classification Search
CPC ............. E05B 47/0001; E05B 47/0012; E05B 45/005; E05B 45/06; E05B 2047/0069;
(Continued)

(56) References Cited

U.S. PATENT DOCUMENTS 3,993,987 A 11/1976 Stevens
2015/0292244 A1* 10/2015 Beatty ................. E05B 47/0012 70/20

(Continued)

FOREIGN PATENT DOCUMENTS

CN 107956318 A 4/2018
CN 108086801 A * 5/2018

(Continued)

OTHER PUBLICATIONS

International Search Report for International Application No. PCT/EP2020/063007, mailed Aug. 21, 2020, 6 page(s).

*Primary Examiner* — Christine M Mills
*Assistant Examiner* — Christopher F Callahan
(74) *Attorney, Agent, or Firm* — Dickinson Wright PLLC

(57) ABSTRACT

A portable lock comprises a lock body and at least one securing part, in particular a U hoop or a bolt, wherein the at least one securing part can be selectively locked to the lock body or released from the lock body. In this respect, the lock body comprises at least one introduction opening for introducing the at least one securing part into the lock body; at least two sensors for detecting the securing part introduced into the lock body and for generating corresponding detection signals; an evaluation and control circuit for determining a current occupancy state of the lock body in dependence on the generated detection signals, wherein the evaluation and control circuit is configured to associate different combinations of generated detection signals with different occupancy states of the lock body; and an electromechanical locking device that has at least one electrically drivable latch for locking the at least one securing part in the at least one introduction opening, wherein the evaluation and control circuit is configured to control the locking device.

25 Claims, 8 Drawing Sheets

Figure 1:
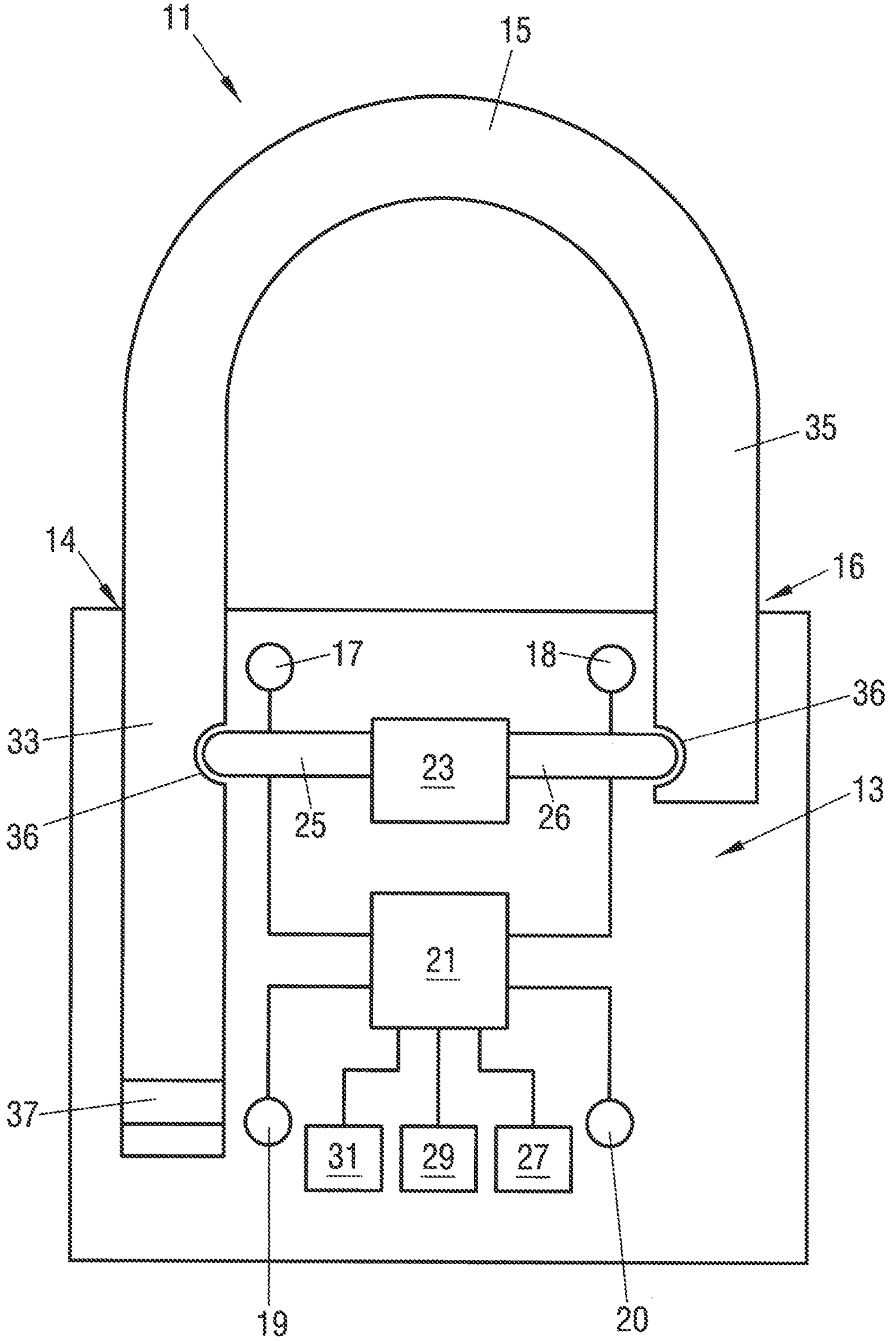

(58) Field of Classification Search
CPC ......... E05B 2047/005; E05B 2045/065; E05B 2045/0655; E05B 2045/0665; E05B 2045/068; E05B 67/22; E05B 67/365; E05B 67/063
See application file for complete search history.

(56) References Cited

U.S. PATENT DOCUMENTS

| | | | | |
|---|---|---|---|---|
| 2020/0242868 | A1 * | 7/2020 | Gengler | G07C 9/00944 |
| 2021/0222461 | A1 * | 7/2021 | Chen | E05B 47/0603 |

FOREIGN PATENT DOCUMENTS

| | | | | |
|---|---|---|---|---|
| CN | 110616971 | A | 12/2019 | |
| DE | 102015119187 | A1 | 5/2017 | |
| DE | 102017105031 | A1 | 9/2018 | |
| WO | 0183921 | A1 | 11/2001 | |
| WO | 2005094172 | A2 | 10/2005 | |
| WO | 2006130660 | A2 | 12/2006 | |
| WO | 2009118515 | A1 | 10/2009 | |
| WO | WO-2011028843 | A2 * | 3/2011 | E05B 39/00 |
| WO | 2015044760 | A1 | 4/2015 | |
| WO | WO-2015045802 | A1 * | 4/2015 | E05B 47/0012 |

* cited by examiner

MOBILE LOCK

CROSS-REFERENCE TO RELATED APPLICATIONS

This application is a U.S. National Stage of International Patent Application Serial No. PCT/EP2020/063007, filed May 11, 2020, which claims the benefit of German Patent Application Serial No. 102019113163.4, filed May 17, 2019. The entire disclosures of each of the above applications are incorporated herein by reference.

The invention relates to a portable lock comprising a lock body and at least one securing part, in particular a U hoop or a bolt, wherein the at least one securing part may be selectively locked to the lock body or released from the lock body, and wherein the lock body comprises at least one introduction opening for introducing the at least one securing part into the lock body; and an electromechanical locking device that has at least one electrically drivable latch for locking the at least one securing part in the at least one introduction opening.

Such a portable lock may, for example, be configured as a U hoop padlock that has a rigid and substantially U-shaped hoop whose two limbs may be introduced into a respective introduction opening and may be locked to the lock body. The limbs of the hoop may in this respect have the same length such that the hoop is introduced equally deep into both introduction openings in the locked state, wherein it is also possible that the limbs have different lengths. Such a design of the hoop may make it possible for the long limb to remain in the introduction opening associated with it in an open position, while the short limb is released from the introduction opening such that the hoop is pivotable about the long limb and may be guided through an object to be secured.

Furthermore, the lock may, for example, be configured as a rope or chain lock, wherein the two ends of a rope or a chain may be fastened to a respective bolt that, as a securing part, may be introduced into an introduction opening of the lock body and may be locked therein. It is also possible to firmly fix one end of the rope or the chain to the lock body and to provide a bolt, which may be locked to the lock body, only at the other end. The rope may thereby always be fixedly connected to the lock, wherein the rope end connected to the bolt may be released from the lock body in the open position. It is further possible that one end of the rope or of the chain has a closed loop, by means of which a noose may be formed, and that a bolt that may be locked to the lock body is provided at the other end.

To enable the locking of such a securing part to the lock body, the electromechanical locking device may comprise one or more electric motors to drive the at least one latch. Furthermore, it is possible to provide one or more electromagnets for driving the at least one latch.

Suck locks offer a large number of application possibilities. For example, the locks may be used to secure loads transported in containers or trucks, for which purpose a container door or a tailgate of a truck may be securely closed by the lock. Different types of locks are conceivable for this purpose, wherein the respective design of the lock may be adapted to the intended area of application.

With such portable locks, it is generally endeavored to achieve as great a flexibility as possible when using the lock, in particular as regards the use of one or more of the different types of securing parts mentioned above.

It is an object of the invention to provide a portable lock that is usable as flexibly and comfortably as possible.

This object is satisfied by a portable lock having the features of claim 1, and in particular in that the lock body comprises at least two sensors for detecting the securing part introduced into the lock body and for generating corresponding detection signals; and an evaluation and control circuit for determining a current occupancy state of the lock body in dependence on the generated detection signals, wherein the evaluation and control circuit is configured to associate different combinations of generated detection signals with different occupancy states of the lock body and to control the locking device.

The sensors provided at or in the lock body may transmit a respective signal to the evaluation and control circuit, said respective signal representing the presence and/or the design of a securing part or of a section of a securing part in the at least one introduction opening. The evaluation and control circuit may derive an occupancy state of the lock body therefrom. In this respect, an occupancy state of the lock body is in particular defined by the type of introduced securing part, its orientation, and the depth of the introduction into the associated introduction opening or the associated introduction openings.

The orientation of the securing part may in particular relate to an arrangement of the securing part relative to the lock body in different angular positions, in particular in two angular positions that differ by 180°. In the case of a securing part that is configured as a U hoop having limbs of different lengths and that is introduced into two introduction openings for locking, the orientation of the securing part may, for example, be characterized by the introduction opening into which the long limb is inserted.

Since the securing part may be released, i.e. completely removed, from the lock body, the handling is facilitated in some applications, in particular with regard to the engaging around of an object to be secured by means of the securing part and the subsequent locking to the lock body. Furthermore, the flexibility of the usability of the lock body is increased since said lock body may also be used for a plurality of securing parts (that are of the same kind or are different). Provision may in particular be made that the securing part is thereby releasable from the lock body such that the at least one latch is electrically driven to perform a movement from a locked position into a release position.

Since the at least two sensors detect the securing part introduced into the lock body and transmit a corresponding signal, different signals may be transmitted on a detection of the securing part and on a non-detection. In the arrangement of n sensors in the lock body, $2^n$ (2 to the power of n) combination possibilities of detection signals are therefore generally possible such that $2^n$ occupancy states of the lock body may generally be distinguished, in particular if these occupancy states are characterized by unambiguous combinations of detection signals.

The information on the occupancy state of the lock body may be further processed and, if necessary, made available to the user to enable a flexible and comfortable use of the lock. Since the evaluation and control circuit is configured to associate the detection signals with different occupancy states and to control the locking device, it is in particular also possible to directly take the information obtained into account in the control of the lock.

The sensors may in this respect be arranged at any desired points within the lock body, wherein an arrangement in the region of the introduction openings is in particular possible in order to implement the detection of a securing part introduced into the introduction opening or a cooperation with the securing part in a particularly simple manner. The respective introduction opening of the lock body may in particular be configured as an elongate introduction passage.

In some embodiments, the lock body may have three or four sensors. In this respect, the lock body may in particular comprise two introduction openings, wherein at least one sensor is associated with each of the introduction openings. This allows both introduction openings to be taken into account for the determination of the occupancy state and in particular detailed information to be obtained on the use of a securing part that is introduced into both introduction openings for locking. However, it is also possible to arrange the three or four sensors at a single introduction opening, irrespectively of the number of introduction openings provided in total at the lock body.

In general, the number of combination possibilities and thus distinguishable occupancy states is further increased by the arrangement of three or four sensors such that the additionally obtained information may be used to extend the area of use of the lock and the flexibility of its use and control.

In some embodiments, two of the at least two sensors are associated with the same introduction opening of the lock body. If two sensors are provided at the lock body, they are therefore arranged at or in the same introduction opening, while in a lock having three or four sensors, the sensors are distributed to different introduction openings.

Since two sensors are associated with a common introduction opening, information on the depth of the introduction of the securing part into this introduction opening may in particular be determined. For example, it may thereby be possible to recognize when a U hoop having limbs of different lengths, whose long limb is introduced into the introduction opening with two associated sensors, is introduced into the introduction opening with its full length. It may e.g. be seen from such a complete introduction of the U hoop that a locking may or should take place. This may again be distinguished from the case when the long limb is only introduced so far that the short limb does not project into the introduction opening associated with it and the lock is thus in an open position. In this position, provision may, for example, be made to pivot the U hoop about the long limb held in the introduction opening in order to move the short limb on a circular path and to guide the U hoop through an object to be secured.

Since two sensors are associated with a common introduction opening, information on the design of the securing part may alternatively or additionally also be determined, in particular information on the shape, for example, in order to code different types of securing parts by different (detectable) designs in the region of the sensors.

Provision may be made that the lock body has two introduction openings, wherein at least one sensor is associated with the one introduction opening and at least one sensor is associated with the other introduction opening. It is thus possible to obtain information on the occupancy state of the lock body with respect to both introduction openings. This may, for example, serve to detect a securing part that is configured as a U hoop and that is introduced into both introduction openings or, in the case of securing parts introduced into only one introduction opening, to detect the number of introduced securing parts and, if necessary, their introduction depth.

In some embodiments, the respective sensor may be configured to distinguish at least between a detection state and a non-detection state and to generate a positive or a negative detection signal accordingly. Such a requirement for the sensor allows a particularly simple design of the sensor and a simple evaluation of the signals since only two types of signals are generated and processed and signal strengths dependent on the respective parameters do not have to be generated and evaluated. However, it is also possible to provide sensors that may provide different signal strengths in dependence on the respective occupancy state and to evaluate said different signal strengths by means of the evaluation and control circuit. The number of combination possibilities may thereby in principle be increased for a fixed number of sensors, wherein the complexity of the sensors and of the evaluation and control circuit has to be adapted to these requirements.

In some embodiments, the respective sensor may comprise an electromechanical contact switch, a capacitive proximity switch, a magnetic switch, an optoelectronic interruption switch, or an optoelectronic proximity switch. The specific design of the sensor may in this respect be adapted to the respective requirements, in particular with respect to the area of application of the lock or of the securing parts to be detected, and is generally arbitrary. A sensor may in particular be provided that provides a high resistance and a simple possibility of detecting or cooperating with the respective securing part.

Provision may be made that respective information on a corresponding securing part is stored in the evaluation and control circuit for the different occupancy states of the lock body. In such embodiments, the lock may comprise a non-volatile memory that may be provided as a structural component of the evaluation and control circuit or separately therefrom. Due to this memory, the evaluation and control circuit may, for example, access an allocation table or look-up table such that information on a corresponding securing part may be determined from the combinations of detection signals associated with the occupancy state of the lock body. It is thereby possible in principle to provide a plurality of securing parts that may be locked to the lock body and to make them available to the user, wherein in each case the full functionality of the lock that is adapted to the securing part may be ensured by the recognition of these securing parts.

This information may, for example, be transmitted to the user or it may be evaluated whether a securing part has been inserted that is suitable for the lock and the desired application. Different actions, in particular with respect to the locking, may possibly be necessary, sensible, or possible for different securing parts such that the information on the securing part corresponding to the occupancy state may generally be processed further and may be taken into account directly or in communication with the user in the control of the locking device.

In some embodiments, the evaluation and control circuit may be configured to evaluate a sequence of different combinations of generated detection signals or to associate said sequence with different occupancy states of the lock body. The evaluation and control circuit may in particular be configured to evaluate the different combinations of generated detection signals in the form of a respective sequence of different combinations. In other words, the evaluation and control circuit may be configured to evaluate not only a combination of generated detection signals, but to evaluate the presence of a specific plurality of combinations of detection signals, in particular in a specific order. Due to the evaluation of consecutive combinations of generated detection signals, a far-reaching determination of the respective occupancy state may also take place with a small number of sensors, for example as regards the orientation or the introduction depth of the securing part.

In some embodiments, the lock body, as already mentioned, may have at least two introduction openings, wherein the at least one securing part may be introduced in two different orientations into the at least two introduction openings, and wherein respective information on the orientation of the at least one securing part is stored in the evaluation and control circuit for the different occupancy states of the lock body. For example, it may in this respect be recognized in which orientation a U hoop having limbs of different lengths is introduced into two introduction openings of the lock, that is in which one of the two introduction openings the long limb of the hoop is introduced and in which one the short limb is introduced. This offers a particular flexibility for the user since the securing part may generally be introduced in any desired orientation into the lock and, due to the recognition of the orientation, the functionality of the lock may be maintained irrespectively of the orientation. Consequently, the user does not have to insert a securing part previously released or removed from the lock body into the lock in a specific orientation to be able to lock the securing part, but the user may introduce the securing part in any desired manner into the introduction openings. In this respect, it may also be possible for a securing part introduced into only one introduction opening to detect the introduction opening into which the securing part is introduced. This information may also be used further in order, for example, to detect and, if necessary, to transmit the possibility or necessity of introducing a further securing part into the open introduction opening or the necessity of a required closure in order to protect the inner space of the lock body.

Provision may be made that respective information on permitted positions of the at least one latch is stored in the evaluation and control circuit for the different occupancy states of the lock body. Thus, it is, for example, possible that a transfer of a latch into a locked position is not possible in a specific occupancy state since the movement path of this latch into the locked position is blocked by the introduced securing part. In such an occupancy state, the attempt to move the latch into a locked position could therefore result in an overload of and damage to the locking device. Furthermore, the transfer of a latch into the locked position may not be sensible if no securing part is present in the associated introduction opening since the latch in the locked position could be damaged on a subsequent introduction of a securing part or could prevent the introduction of the securing part in an unwanted manner.

Since the evaluation and control circuit may recognize a locked position in the above-mentioned examples as not permitted on the basis of the respective occupancy states, this information may be taken into account in the control of the locking device such that the evaluation and control circuit outputs only one control signal for permitted latch positions to the locking device. In this respect, the control may take place both directly and in communication with the user. This information on permitted latch positions may also be seen from an allocation table or look-up table that is provided in a non-volatile memory, wherein this memory may be provided integrated into the evaluation and control circuit and separately therefrom.

The locking device may in particular have two latches, wherein respective information on permitted positions of both latches is stored for the different occupancy states of the lock body.

In some embodiments, the locking device may have at least two latches that may be driven independently of one another. A securing part that is introduced into two introduction openings may thereby, for example, be flexibly locked in both introduction openings. A long limb of a U hoop may in particular still be held in the associated introduction opening, while a short limb is already removed from the lock body such that the U hoop may be pivoted about the long limb and may be guided through an object to be secured. Furthermore, in a lock body having a plurality of introduction openings, a plurality of securing parts may thus be flexibly introduced and locked or released.

The independent drive of the latches may in particular be achieved in that the electromechanical locking device has a separate drive unit for each latch, or in that a drive unit common to a plurality of latches is selectively effective for the plurality of latches, for example, by using a slot guide or a drive cam, whereby different and in particular sequentially set positions of the latches may be controllable.

The electromechanical locking device may generally have one or more electric motors that may in particular be configured as a gear motor. A drive of the latches by means of one or more electromagnets may likewise be provided.

Provision may be made that the evaluation and control circuit is configured to control the electromechanical locking device in dependence on the determined current occupancy state of the lock body. In this respect, the locking device may be directly controlled in dependence on the occupancy state, while the control may also take place in further steps and in particular in communication with a user, but taking into account the current occupancy state. A control of the locking device in dependence on the current occupancy state therefore also comprises only a permissibility check for an external control command taking place such that a requested latch movement is only performed when the desired latch position is also permitted or possible in the current occupancy state of the lock body. For example, an overload of the locking device through attempts to transfer a latch into a position that is impossible due to the occupancy state may be avoided by this taking account of the current occupancy state. Provision may again be made that the evaluation and control circuit accesses an allocation table or look-up table available in a non-volatile memory to determine permitted latch movements.

In some embodiments, the lock body may have a radio module that is connected to the evaluation and control circuit. This radio module may in particular be configured to receive or transmit signals via a mobile radio connection, a Wifi/WLAN connection, and/or a Bluetooth connection. Such a radio module may enable a flexible communication with the user to whom information on the lock and in particular on the current occupancy state may be transmitted, wherein requests or commands of the user may also be received. A communication of the user with the lock or its control may thus take place in principle without the user being in the direct vicinity of the lock.

The radio module may be configured to transmit the current occupancy state of the lock body as a radio signal. Accordingly, the information obtained from the occupancy state of the lock body may be made available to the user. In this respect, only information on the current occupancy state of the lock body may be transmitted and may be processed by a receiver device of the user, for example a mobile radio device, to provide the information included in the occupancy state. However, it is also possible that the occupancy state is already analyzed in the evaluation and control circuit and the information included is transmitted directly without a further evaluation having to take place.

In some embodiments, the radio module may be configured to receive a control command for the locking device by radio, wherein the evaluation and control circuit is configured to control the locking device in response to the received control command. In such embodiments, the user may monitor and control the lock over larger distances and may in particular open or close it himself to enable access to the secured object for a person present in the vicinity of the lock.

The lock body may have a GPS (Global Positioning System) receiver to determine a current position of the lock body, wherein the radio module may be configured to transmit the determined current position as a radio signal. The current position of the lock may thereby be communicated to the user such that the user may, for example, check and track the position during a transport of an object, such as a container, secured by the lock.

In some embodiments, the lock body may have an alarm device that in particular comprises a circuit monitoring; a tamper contact; the at least two sensors; an acceleration sensor; and/or a vibration sensor. Due to the attachment of such an alarm device, the security of the lock may be further increased in that the user or persons present in the environment of the lock may be alerted to a manipulation attempt or a break-open attempt by the generation of an alarm. In this respect, it is possible to trigger an alarm signal in dependence on detected vibrations or position changes of the lock since the lock usually experiences a vibration during a break-open attempt due to the forces applied. A possible design of such an alarm device, in which the triggering of an alarm takes place on the basis of detected vibrations or position changes, may be seen from DE 10 2017 105 031 A1, for example. Furthermore, the at least two sensors that are anyway present may be used to detect a manipulation attempt, for example, on the basis of a change in the occupancy state of the lock body that is not due to an action of the user.

In some embodiments, the evaluation and control circuit may be configured to control the alarm device. For this purpose, the evaluation and control circuit may, for example, be connected to the sensors detecting a manipulation attempt and may evaluate their signals in order to trigger an alarm. Provision may furthermore be made that the evaluation and control circuit may cause a switching off of the alarm device to prevent an unnecessary energy consumption by the alarm device when the triggering of an alarm is not desired. This may, for example, be the case if the lock is in a transport state in which it experiences vibrations, but no disturbing alarm is to be triggered. This may be desired when the lock is transported and moved between different locations of use without a security function. This control may further in particular also take place without taking into account the current occupancy state of the lock body such that the alarm device may, for example, be switched off if the evaluation and control circuit detects on the basis of the occupancy state that no securing part is inserted and the lock is thus not in use.

In some embodiments, the lock body may comprise a radio module or the already mentioned radio module that is configured to output an alarm as a radio signal. The user may thereby be informed of manipulation attempts even when he is not in the direct vicinity of the lock. As a result, the user may initiate or perform the necessary measures for protecting the secured object such that any manipulation attempts may be made even more difficult by this possibility of transmitting the alarm.

The radio module may be configured to receive a control command for the alarm device by radio, wherein the evaluation and control circuit may be configured to control the alarm device in response to the received control command. Due to this possibility of an external control of the alarm device, the flexibility of the user may again be increased in that he may, for example, temporarily switch off the alarm device to reduce the energy consumption of the lock or to suppress an unwanted triggering of the alarm, for example during a transport of the lock.

In some embodiments, the lock body may have an electrical energy source (e.g. a battery, an accumulator) for the energy supply of further components of the portable lock, wherein the evaluation and control circuit may be configured to control the energy supply of at least one of the further components, in particular in dependence on the determined current occupancy state of the lock body. Specific components or functions may thereby be at least temporarily deactivated, for example a radio module, an alarm device or a GPS receiver, if they are not required due to the current use of the lock. An excessive and unnecessary energy consumption may thus be prevented such that a long usability of the lock may be achieved without interruptions for charging or changing the electrical energy source being necessary.

The current occupancy state of the lock body may in particular be taken into account in the control or the selective deactivation of the energy supply. For example, different components, such as a radio module or an alarm device, may be switched off if it is detected on the basis of the current occupancy state that no securing part is introduced into the lock body and the lock is therefore not in use. If the occupancy state changes due to an introduction of the securing part, the components may be activated again. The energy consumption of the lock may thus be adapted to the current use of the lock and may be minimized in accordance with the respective application.

The invention further relates to a lock system comprising a portable lock in accordance with any one of the previously described embodiments; and at least one further securing part, wherein the already described at least one securing part and the further securing part are configured to trigger the generation of different combinations of detection signals when either the one securing part or the further securing part is introduced into the at least one introduction opening of the lock body. It is thus possible to obtain information on the respective introduced securing part from the combinations of the detection signals and to evaluate this information. Furthermore, the information on the introduced securing part may be further processed or transmitted to a user, if necessary.

In such a lock system, a plurality of different securing parts may thus selectively be locked to the lock body alternatively to one another and/or together and the respective occupancy state of the lock body may be determined and taken into account by the evaluation and control circuit. A flexible usability of the lock body hereby results since said lock body may be selectively used for a plurality of different securing parts.

Thus, in some embodiments, the one securing part may, for example, comprise a U-shaped hoop (having two limbs of equal length or different lengths that occupy two introduction openings of the lock body) and the at least one further securing part may comprise a bolt (that occupies only one introduction opening of the lock body).

In some embodiments, the evaluation and control circuit may be configured to associate the different combinations of detection signals with a respective securing part. This may take place by providing a non-volatile memory with an allocation table or look-up table in which the information on the securing part corresponding to a specific combination of detection signals is stored. This memory may in this respect be provided as a part of the evaluation and control circuit and also as a separate component.

Due to this distinction of the different securing parts, it is possible to perform different further actions, such as movements of the latches adapted to the securing part or the control of locking or release positions of the latches suitable for the securing part, or to request such actions from the user.

The lock system may comprise an adapter that may be introduced into the at least one introduction opening of the lock body. The adapter may in particular be configured such that it may be connected to a securing part and this securing part may be introduced into the at least one introduction opening together with the adapter. Different types of securing parts may hereby be adapted to the lock body and may be locked to the lock body even if the respective securing part is not directly configured for the lock body or its introduction opening(s). The adapter may further serve to close one introduction opening, while a securing part is introduced into another introduction opening in order, for example, to protect the inner space of the lock body from contamination or wear through incoming fluid.

In some embodiments, the adapter may be configured to trigger the generation of a predetermined combination of detection signals on its own and/or together with an associated securing part when the adapter is introduced into the at least one introduction opening. Since the adapter triggers a predetermined combination (on its own and/or together with an associated securing part), it is possible to detect an adapter introduced into the introduction opening, wherein this information may also be taken into account in the control of the lock and in particular of the locking device.

Provision may be made that the predetermined combination differs from the combinations of detection signals that are triggered by the already described one securing part and/or the further securing part of the lock system. Due to this distinction, the generated detection signal may be unambiguously associated with the adapter and said adapter may be recognized by the evaluation and control circuit.

In some embodiments, the further securing part or a third securing part of the lock system may be selectively lockable to the lock body when the adapter is inserted into the at least one introduction opening or said further securing part or third securing part may be inserted into the at least one introduction opening together with the adapter and may be locked to the lock body. An introduction of the respective securing part into the introduction opening without an adapter may in particular indeed be possible, but said respective securing part may then not be locked securely and fixedly. For example, a U hoop whose cross-sectional diameter is too small to be securely locked in the at least one introduction opening of the lock body may be connected to an adapter that enables the U hoop to be securely locked to the lock body.

In this respect, it may be possible to first introduce an adapter into an introduction opening, whereupon the securing part is inserted, or to first connect the adapter to the securing part and then to introduce the connected parts together. The adapter may further, for example, be used to increase the cross-sectional diameter of a securing part, while it may also be possible to extend a securing part by the adapter and thereby to enable a locking of the securing part in the lock body.

Due to such an adapter, the flexibility with respect to the areas of application of the lock may consequently be considerably extended since a plurality of securing parts may be locked to the lock body due to the possibility of the connection to the adapter. The user may thus in particular select securing parts adapted to his respective requirements and may lock them to the lock body and it is also possible to flexibly replace the securing parts when the portable lock is used in a different area of use or for securing a different object.

In this respect, independently of the portable lock explained that has sensors for detecting the securing part introduced into the lock body and an electromechanical locking device, the present invention also further generally relates to a lock system comprising a lock; at least one securing part (in particular a U hoop or a bolt); and an adapter of the type described above, wherein the lock has a lock body having at least one introduction opening into which the adapter may be introduced, and wherein the at least one securing part may be selectively locked to the lock body when the adapter is inserted into the at least one introduction opening.

In such a lock, the lock body may comprise a locking device (in particular a purely mechanical or electromechanical locking device) having at least one latch for locking the at least one securing part in the introduction opening. In some embodiments, the at least one securing part may be releasable, i.e. completely removable, from the lock body in a release position of the locking device or the at least one latch. In some embodiments, the lock body may have two introduction openings.

Due to such an adapter, different types of securing parts may be adapted to the lock body and may be locked to the lock body even if the respective securing part is not directly configured for the lock body or its introduction opening(s).

The invention will be described in the following with reference to the drawings. They merely show possible embodiments of a portable lock or of a lock system and are in no way to be understood as conclusive representations. Further embodiments may rather be seen from the description and the claims.

Figure 2:
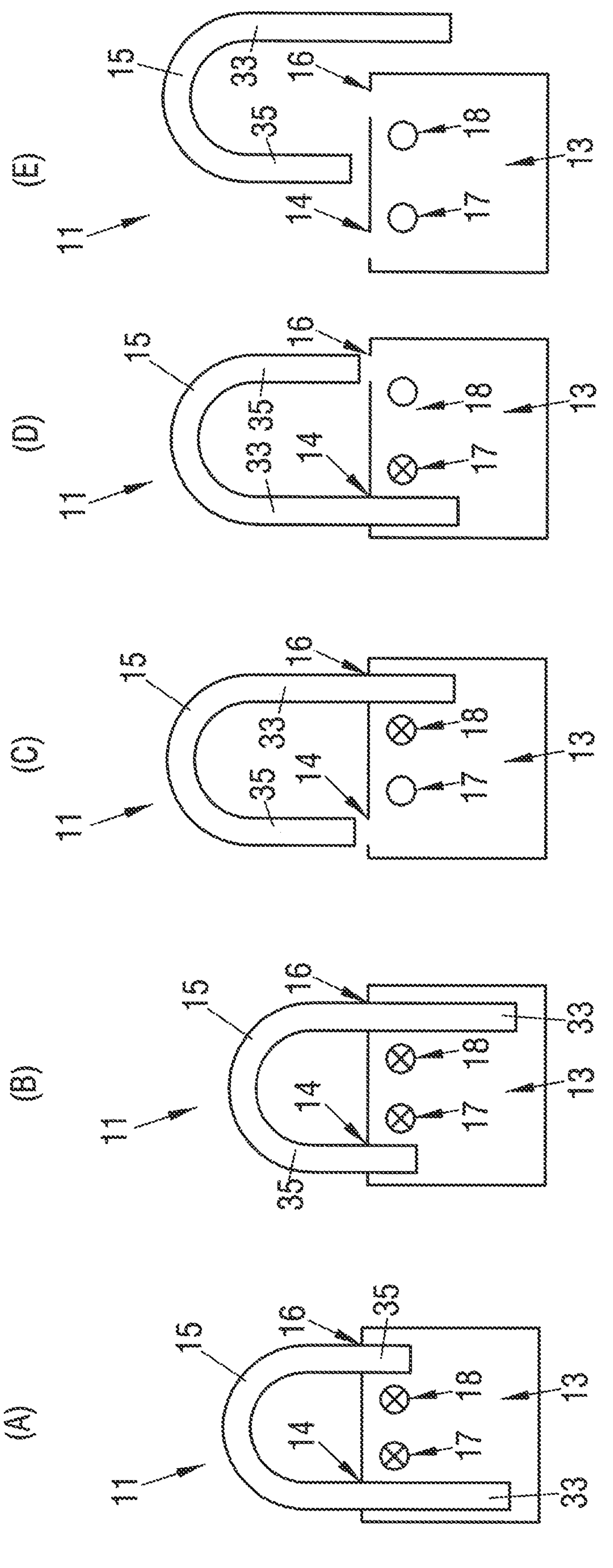
Figure 3:
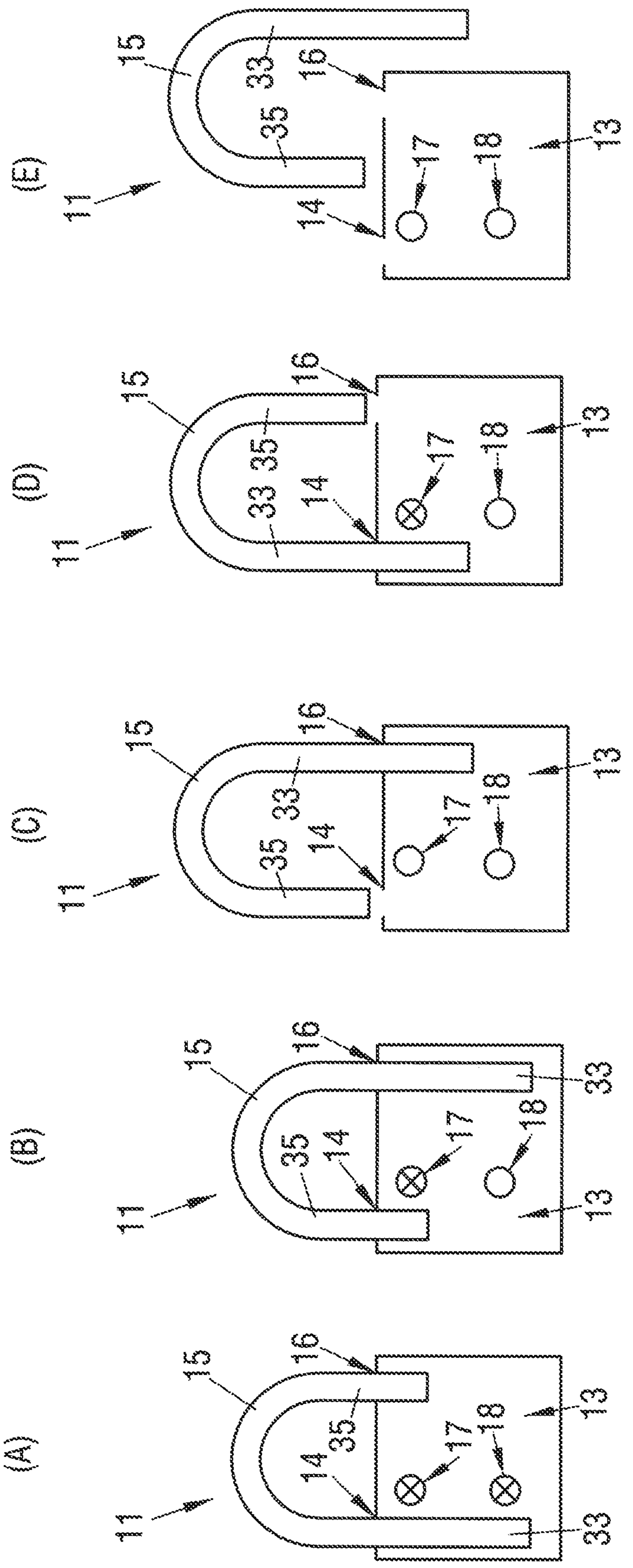
Figure 4:
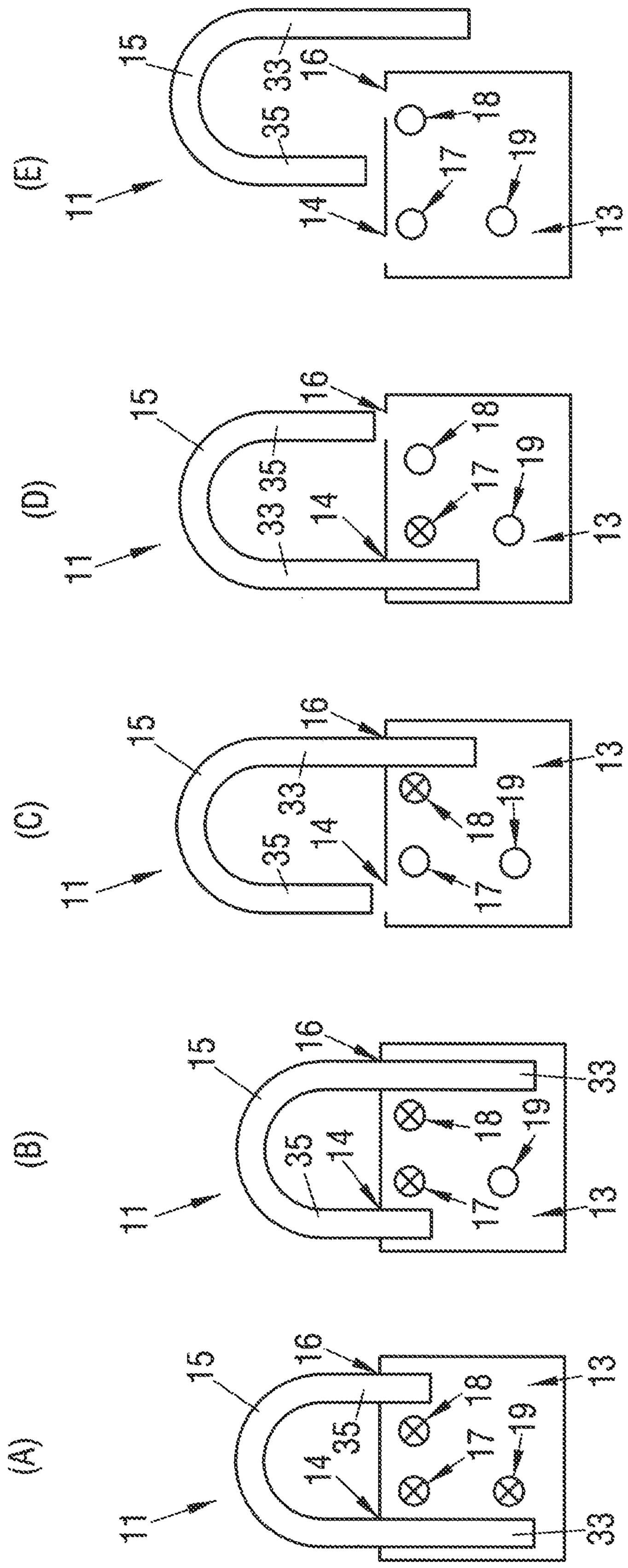
Figure 5:
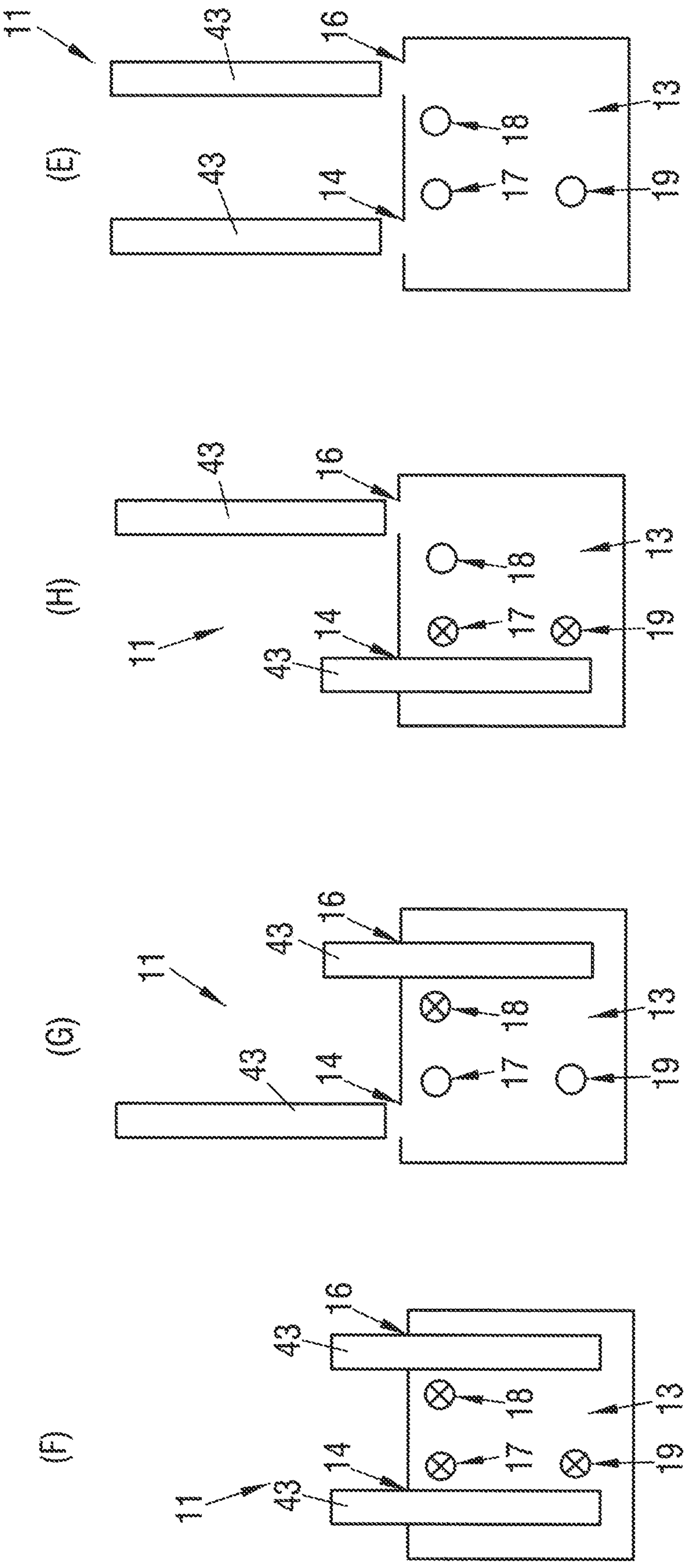
Figure 6:
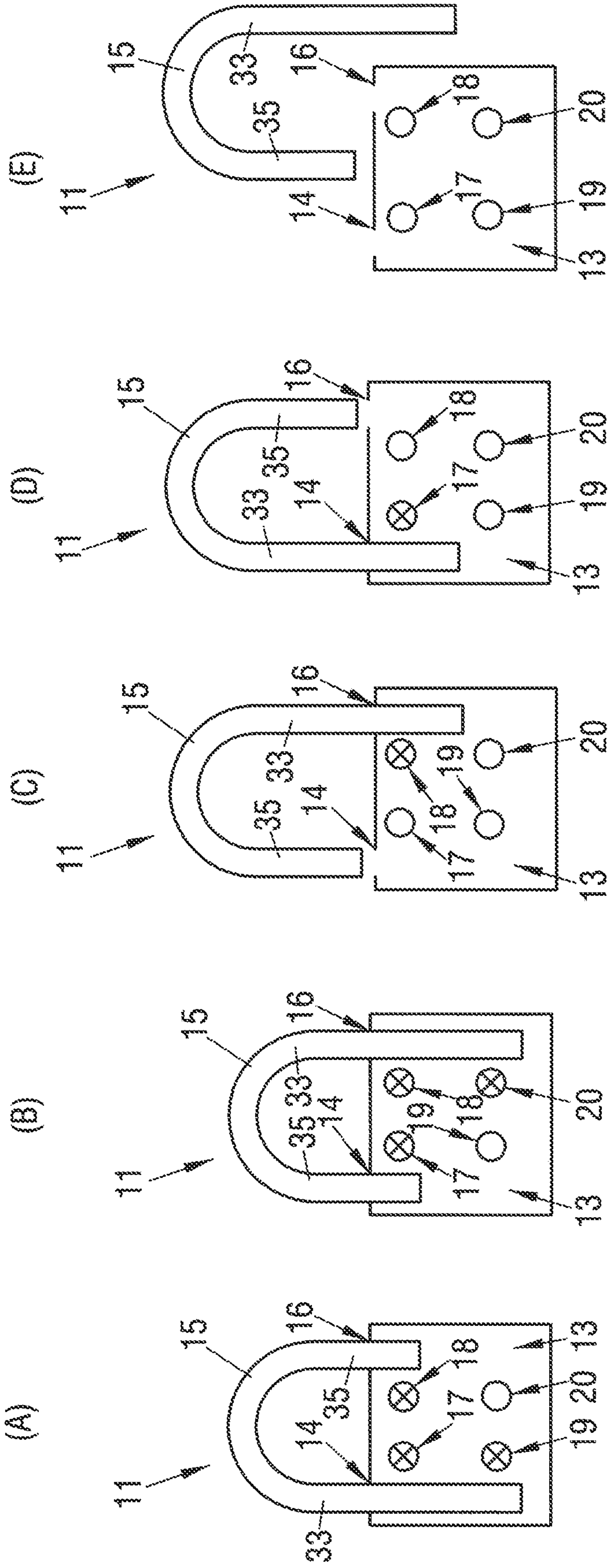
Figure 7:
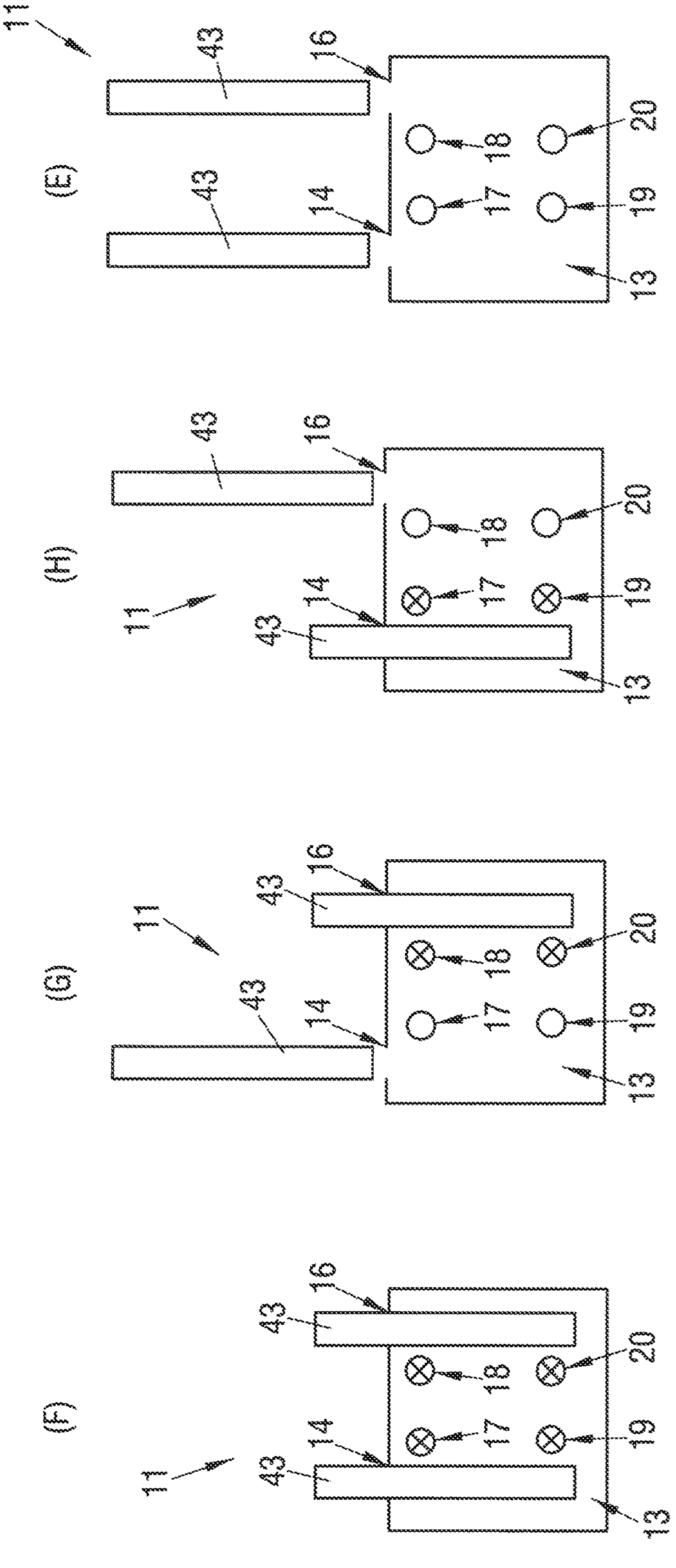
Figure 8:
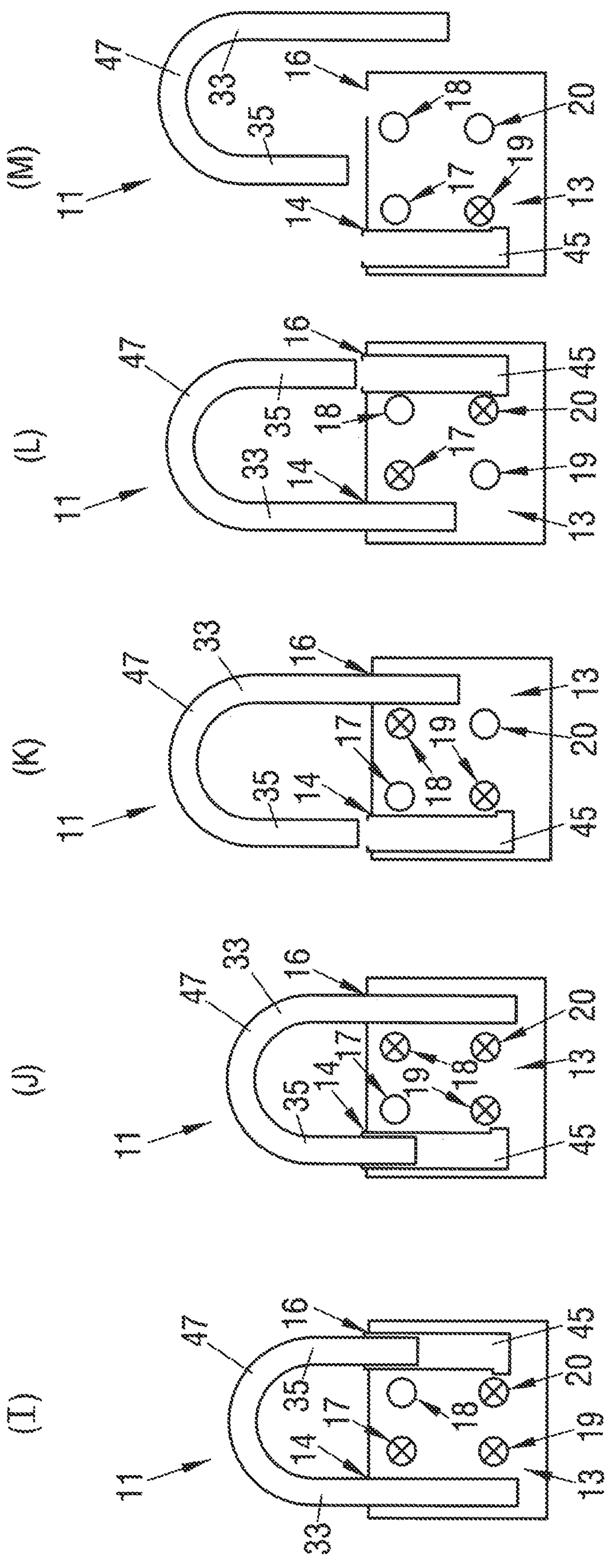

There are shown:

FIG. 1 a schematic representation of a portable lock with two introduction openings and four sensors for detecting an introduced securing part;

FIG. 2 schematic representations of different occupancy states of a lock body of a portable lock with two introduction openings and two sensors for detecting an introduced securing part, wherein the sensors are each associated with one of the two introduction openings;

FIG. 3 schematic representations of different occupancy states of a lock body of a portable lock with two introduction openings and two sensors, wherein the sensors are associated with the same introduction opening;

FIGS. 4 and 5 schematic representations of different occupancy states of a lock body of a portable lock, which is part of a lock system comprising two different types of securing parts, with two introduction openings and three sensors for detecting the introduced securing part, wherein two sensors are associated with the one introduction opening and one sensor is associated with the other introduction opening; and FIGS. 6 to 8 schematic representations of different occupancy states of a lock body of a portable lock, which is part of a lock system comprising three different types of securing parts and an adapter, with two introduction openings and four sensors for detecting the introduced securing part or the adapter, wherein a respective two sensors are associated with the two introduction openings.

The portable electronic lock 11 shown schematically in FIG. 1 is configured as a U hoop lock and has a substantially U-shaped securing part 15 that is introduced with the limbs 33 and 35 of the U hoop into the two introduction openings 14 and 16 of the lock body 13 and that may be selectively locked to the lock body 13 or released therefrom. The two limbs 33 and 35 of the securing part 15 are of different lengths such that the long limb 33 is introduced deeper into the associated introduction opening 14 than the short limb 35 is introduced into the associated introduction opening 16. This design of the portable lock 11 as a U hoop lock and the design of the securing part 15 as a U hoop having limbs 33 and 35 of different lengths each merely serve for the schematic representation of a portable lock 11. Further embodiments of the portable lock 11, for example as a cable lock, chain lock or folding lock having corresponding securing parts, and further embodiments of a securing part 15 configured as a U hoop, in particular having limbs 33 and 35 of equal length, are possible.

The securing part 15 may be locked to the lock body 13 by two latches 25 and 26. In this respect, the latches 25 and 26 may be driven independently of one another by an electromechanical locking device 23 and may adopt a locked position or a release position or may be transferred from the one position into the other. To independently drive the two latches 25 and 26, the locking device may have one or more electric motors, which may in particular be configured as a gear motor, or one or more electromagnets. To implement an independent drive with only one electric motor or one electromagnet, a slot guide or a drive cam may, for example, be provided, whereby different and in particular sequentially set positions of the latches 25 and 26 may be controlled.

In the representation shown, the latches 25 and 26 are in the locked position and each engage into an indentation 36 of the long limb 33 and of the short limb 35 to lock the securing part 15 against a removal. For illustration, the indentations 36 are shown wider here than the latches 25 and 26, wherein a design with an exact fit may be desired for an exact reception of the latches 25 and 26 to limit the freedom of movement of the securing part 15 in the locked state as much as possible. In the lower region of the long limb 33, the securing part 15 may further have a peripheral notch 37 into which the latch 25 may engage in a state in which the short limb 35 is already removed from the lock body 13. Due to this engagement of the latch 25 into the notch 37 when the limb 35 is released, on the one hand, the securing part 15 may be held in the lock body 13 and an uncontrolled release may be avoided and, on the other hand, the securing part 15 may be pivoted about the axis of the long limb 33 to be able to guide the U hoop or the securing part 15. For an engagement into the notch 37, an engagement position of the latches 25 and 26 may in this respect be provided that may correspond to the locked position or differ therefrom.

The portable lock 11 further comprises four sensors 17, 18, 19, and 20 for detecting the securing part 15 introduced into the lock body 13. Two of the sensors, the sensors 17 and 19, are associated with the introduction opening 14, while the two other sensors 18 and 20 are associated with the introduction opening 16. Thus, an introduced securing part 15 may be detected in both introduction openings 14 and 16 by the sensors 17, 18, 19, and 20. This number of sensors for detecting the introduced securing part 15 and their arrangement at the introduction openings 14 and 16 are also purely exemplary.

The sensors 17, 18, 19, and 20 may, for example, have an electromechanical contact switch for detecting the introduced securing part 15. The specific design of the sensors 17, 18, 19, and 20 may in this respect be adapted to the respective requirements with regard to the area of use of the portable lock 11, wherein a simple cooperation of the sensors 17, 18, 19, and 20 with the securing part 15 may be provided for detecting said securing part 15.

The sensors 17, 18, 19, and 20 may be configured to distinguish between a detection state and a non-detection state of the securing part 15 and may accordingly transmit a positive or a negative detection signal. For example, a positive signal may be transmitted when the securing part 15 is detected in the region of a sensor 17, 18, 19, or 20 and a negative signal may be generated when the securing part 15 is not detected. In the representation shown, the sensors 17, 18, and 19 may accordingly generate a positive signal due to the detection of the securing part 15, while the sensor 20 generates a negative signal.

In an arrangement of a number n of such sensors that can distinguish between a detection state and a non-detection state, $2^n$ (2 to the power of n) different combinations of detection signals may thus generally be generated and distinguished. The portable lock 11 shown comprising an arrangement of four sensors 17, 18, 19, and 20 consequently allows the generation of sixteen different combinations of detection signals that may potentially be associated with corresponding occupancy states of the lock body 13. While such a design of the sensors 17, 18, 19, and 20 may enable as simple as possible a signal generation and signal evaluation, provision may generally also be made that further, distinguishable signal strengths may be generated by the sensors 17, 18, 19, and 20 in order to increase the number of possible combinations.

The sensors 17, 18, 19, and 20 are connected to an evaluation and control circuit 21 that evaluates and analyzes the respective transmitted signals or their combination. This evaluation and control circuit 21 is in particular configured to associate different combinations of detection signals, which are transmitted by the sensors 17, 18, 19, and 20, with different occupancy states of the lock body 13. Such an occupancy state is defined by the introduced securing part 15, the depth of the introduction of the securing part 15 into one or both of the introduction openings 14 and 16, and the orientation of the introduced securing part 15. In FIG. 1, the occupancy state is therefore determined by a securing part 15 that is configured as a U hoop, that has limbs 33 and 35 of different lengths, that is introduced completely, i.e. as far as possible, into the introduction openings 14 and 16 of the lock body 13, and that is oriented such that the long limb 33 is introduced into the introduction opening 14 and the short limb 35 is introduced into the introduction opening 16. Further possible occupancy states are in particular shown and explained in FIGS. 2 to 8.

Since the evaluation and control circuit 21 may associate different combinations of detection signals with different occupancy states of the lock body 13, the parameters characterizing this occupancy state may be determined. For this purpose, the evaluation and control circuit 21 may, for example, comprise a non-volatile memory in which an allocation table or look-up table is stored such that information on a corresponding securing part 15 may, for example, be available for the different occupancy states. Furthermore, respective information on possible orientations of the securing part 15 or permitted positions of the latches 25 and 26 may be stored in such a memory for the different occupancy states of the lock body 13. The memory may in this respect, as in the example of FIG. 1, be integrated into the evaluation and control circuit 21, but may also be provided separately therefrom.

Furthermore, the evaluation and control circuit 21 is connected to the locking device 23 and is configured to control the latter and thus to determine the movement of the latches 25 and 26. This control may in particular take place while taking into account the determined current occupancy state of the lock body 13 in that, for example, the permissibility of specific positions of the latches 25 and 26 is checked and a control signal is only output for the transfer into a permitted position. If, for example, no securing part 15 is introduced into the lock body 13, a transfer of the latches 25 and 26 into their locked position is usually not sensible or permitted since the latches 25 and 26 could be damaged on a subsequent introduction of the securing part 15. Since the evaluation and control circuit 21 may detect the occupancy state of the lock body 13 when the securing part 15 is removed, said evaluation and control circuit 21 may recognize the locked position of the latches 25 and 26 as not permitted for this occupancy state and may not output a control signal for transferring the latches 25 and 26 into the locked position. Damage to the latches 25 and 26 or the securing part 15 on a subsequent introduction of the securing part 15 may therefore be avoided by such a permissibility check.

Furthermore, the evaluation and control circuit 21 may, for example, take into account the determined current occupancy state of the lock body 13 insofar as a check is performed before a transfer of the latches 25 and 26 into the locked position as to whether the securing part 15 is completely introduced into the lock body 13.

A further possible functionality of the evaluation and control circuit 21 comprises monitoring whether, starting from a determined current occupancy state of the lock body 13, a change in the detection signals of the sensors 17, 18, 19, 20 occurs even though no movement of the latches 25 and 26 has been initiated; a manipulation attempt or break-open attempt may in particular be concluded therefrom.

A radio module 27 is further arranged in the lock body 13 and is connected to the evaluation and control circuit 21. By means of this radio module 27, the current occupancy state of the lock body 13 or information obtained therefrom on an introduced securing part 15 and its introduction depth and orientation may be transmitted to a user, for example. In this respect, this transmission may, for example, take place via a mobile radio connection, a Wifi/WLAN connection, and/or a Bluetooth connection. Furthermore, commands of a user may be received via the radio module 27 and may be transmitted to the evaluation and control circuit 21 such that a user may in particular control the locking device 23 via a mobile radio device. Thus, a locked portable lock 11 may, for example, be unlocked by an authorized user without the user being in the direct environment of the lock 11 such that the user may grant other persons access to a secured object, for example, to the contents of a container transferred to the destination. Due to such a control of the portable lock 11, in particular taking into account the current occupancy state of the lock body 13, a flexible and versatile use of the portable lock 11 may be achieved.

Furthermore, the lock body 13 may optionally comprise a GPS receiver 29 by means of which the current position of the portable lock 11 may be determined. This GPS receiver 29 is also coupled to the radio module 27 via the evaluation and control circuit 21 such that the current position of the portable lock 11 may be transmitted to or queried by a user. Thus, a user may, in particular when the object secured by the portable lock 11 is moved or transported, determine and track the current position of the portable lock 11 at any time.

To further increase the security of the portable lock 11, an alarm device 31 may optionally be provided which is connected to the evaluation and control circuit 21 and by which an alarm is triggered when a manipulation attempt is recognized. To recognize such a manipulation attempt, the alarm device 31 may in particular comprise a circuit monitoring; a tamper contact; the sensors 17, 18, 19, and 20; an acceleration sensor; and/or a vibration sensor. Since a lock 11 is usually subjected to large forces during a break-open attempt, vibrations often occur in this respect and may be recognized by an acceleration sensor or a vibration sensor such that an alarm may be triggered by the alarm device 31. Furthermore, as explained above, a change in the occupancy state that is not due to an action of the authorized user may indicate a manipulation attempt or a break-open attempt such that the sensors 17, 18, 19, and 20 may also be used to recognize such an attempt.

To provide further protection against break-open attempts, the radio module 27 may be configured to transmit an alarm signal generated by the alarm device 31 to a user via radio. A user who is not in the vicinity of the portable lock 11 may thereby also be informed of a manipulation attempt or a break-open attempt such that he may initiate the necessary measures to protect the object to be secured.

The portable lock 11 further has an electrical energy source, not shown, by means of which the further components and in particular the evaluation and control circuit 21, the locking device 23, the alarm device 31, the radio module 27, and the GPS receiver 29 are supplied with energy. In this respect, provision may be made to control the energy supply of the further components of the portable lock 11 by the evaluation and control circuit 21. The evaluation and control circuit 21 may in particular be configured to separate the further components from the energy supply or to temporarily switch off the components in order to reduce the energy consumption of the portable lock 11.

For example, the alarm device 31 may be switched off when the portable lock 11 is transported, while the portable lock 11 does not serve for the securing such that a triggering of an alarm based on recognized vibrations is not desired. This may in particular occur due to a command transmitted by the user to the radio module 27. In addition, the radio module 27 or the GPS receiver 29 may also be temporarily switched off to reduce the energy requirement of the portable lock 11.

This control of the energy supply may also take place while taking account of the current occupancy state of the lock body 13 in that, for example, one or more components may be switched off if it is recognized on the basis of the occupancy state that no securing part 15 is introduced into the lock body 13 and the portable lock 11 is therefore currently not used for securing purposes. The evaluation and control circuit 21 may in particular be configured to deactivate the alarm device 31 and/or set it into a state of an energy consumption that is reduced compared to a monitoring operation if it results from the determined current occupancy state of the lock body 13 that no securing part 15 is currently inserted into the lock body 13. Due to the energy savings resulting therefrom, a long usability of the portable lock 11 may be made possible without the necessity of replacing or charging the electrical energy source.

FIGS. 2 to 8 each schematically show different occupancy states of lock bodies 13 of portable locks 11 and the combinations of detection signals that correspond to the occupancy states and that are generated by a selection of the sensors 17, 18, 19, and 20 arranged in the respective lock body 13 on a detection of an introduced securing part 15, 43, or 47 or of an adapter 45. In this respect, a sensor marked by an "X" illustrates the generation of a positive signal that communicates the detection of a securing part 15, 43, or 47 or of the adapter 45, while sensors that are not filled and that are only shown as circular indicate the transmission of a negative signal in a non-detection state.

The lock bodies 13 of the portable locks 11 shown each have two introduction openings 14 and 16 and comprise a securing part 15 that is configured as a U hoop, that may be introduced with the two limbs 33 and 35 into the introduction openings 14 and 16, and that may be selectively locked to or released from the lock body 13. In this respect, the limbs 33 and 35 of the securing part 15 are of different lengths, wherein the limb 33 is longer than the limb 35. This embodiment of both the portable lock 11 having two introduction openings 14 and 16 and the securing part 15 as a U hoop having limbs 33 and 35 of different lengths is purely exemplary, wherein in particular another design of the lock body 13 having a different number of introduction openings and another securing part 15, for example also as a U hoop having limbs 33 and 35 of equal length, may be provided.

Furthermore, FIGS. 4 and 5 show a lock system that, in addition to the portable lock 11 and the securing part 15, comprises two further securing parts 43 configured as bolts. FIGS. 6 to 8 show a lock system comprising a portable lock 11; the securing part 15 configured as a U hoop; two further securing parts 43 configured as bolts; a third securing part 47 configured as a U hoop; and an adapter 45 that may be connected to the third securing part 47 for its locking to the lock body 13.

The portable lock 11 shown in FIG. 2 comprises two sensors 17 and 18 for detecting the introduced securing part 15 that are each associated with one of the two introduction openings 14 and 16. Such an arrangement or number of sensors generally allows the generation of four different combinations of detection signals that may be associated with different occupancy states of the lock body 13.

In the occupancy state (A), the securing part 15 configured as a U hoop is completely introduced into the two introduction openings 14 and 16 such that it may be locked to the lock body 13. The securing part 15 is in this respect oriented such that the long limb 33 is introduced into the introduction opening 14 and the short limb 35 is introduced into the introduction opening 16. Both sensors 17 and 18 detect the securing part 15 in the respective associated introduction openings 14 and 16 and transmit correspondingly positive detection signals. The combination of two positive detection signals may thus be associated with the occupancy state (A), wherein this occupancy state (A) corresponds to the securing part 15 completely introduced into the lock body 13.

In the occupancy state (B), the securing part 15 is again completely introduced into the lock body 13, but in the reverse orientation (angular position rotated by 180° with respect to the vertical axis) such that the long limb 33 is introduced into the introduction opening 16 and the short limb 35 is introduced into the introduction opening 14. For this occupancy state (B), the two sensors 17 and 18 also each transmit a positive detection signal such that the combinations in the occupancy states (A) and (B) do not differ. Thus, the information of the completely introduced securing part 15 may indeed be obtained, but no information on its orientation may be obtained from the respective combinations. For many applications, no restrictions result from this indistinguishability of the occupancy states (A) and (B), however. It may in particular be sufficient to obtain information on the introduction of the securing part 15 that took place completely in each case.

In the occupancy state (C), the securing part 15 is only partly introduced into the lock body 13 such that the long limb 33 is partly introduced into the introduction opening 16, while the short limb 35 is released from the introduction opening 15. Accordingly, the sensor 18 associated with the introduction opening 16 generates a positive signal, while the sensor 17 that is associated with the introduction opening 14 and that is in the non-detection state transmits a negative detection signal. The evaluation and control circuit 21 (FIG. 1) may hereby, for example, derive information on the orientation of the securing part 15, that is on which introduction opening (namely 16) the long limb 33 is introduced into, on an introduction of the securing part 15 into the lock body 13, and indeed before the reaching of the occupancy state (B) of the complete introduction. For this purpose, the evaluation and control circuit 21 may be configured to evaluate a sequence of different combinations of generated detection signals or to associate them with different occupancy states of the lock body 13.

In the occupancy state (D), the securing part 15 is also partly introduced into the lock body 13, wherein it is oriented such that the long limb 33 is partly introduced into the introduction opening 14, while the short limb 35 is released from the introduction opening 16. For this occupancy state (D), the sensor 17 arranged at the introduction opening 14 transmits a positive signal and the sensor 18 arranged at the introduction opening 16 transmits a negative signal.

Consequently, the information of a partly introduced securing part 15 and its orientation may be obtained from the occupancy states (C) and (D) since the generated combinations of detection signals differ from one another. This information may, for example, be used to hold the partly introduced long limb 33 of the securing part 15 in the respective introduction opening 14 or 16 by a control of the locking device 23 shown in FIG. 1 such that the securing part 15 may be pivoted about this long limb 33. This may, for example, take place in that the respective associated latch 25 or 26 engages into a peripheral notch 37 arranged in the lower region of the long limb 33. Due to the distinguishability of the generated combinations in the occupancy states (C) and (D), the orientation of the securing part 15 may further, as explained, be unambiguously determined and the respective provided latch 26 or 25 may be brought into the engagement position, while the respective other latch 25 or 26 may be displaced into the release position.

In the occupancy state (E), the securing part 15 is completely released from the lock body 13 such that neither the sensor 17 nor the sensor 18 detects a securing part and both sensors 17 and 18 transmit a negative signal. A securing part 15 removed from the lock body 13 may thus be associated with this combination of two negative detection signals. Such information may, for example, be used to move the latches 25 and 26 of the locking device 23 into a release position such that the securing part 15 may be introduced.

Already due to this arrangement of two sensors 17 and 18, four occupancy states of the lock body 13 may consequently be identified on the basis of the respective generated combinations of detection signals of the sensors 17 and 18. Only the occupancy states (A) and (B) may not be directly distinguished from one another due to the identical combination of the detection signals. Since these occupancy states, however, correspond to a completely introduced securing part 15 with only a different orientation, the same control processes, such as the transfer of both latches 25 and 26 into the locked position, are usually anyway provided in these occupancy states. The control of the locking device 23 may thus be adapted to the respective occupancy state and a flexible usability of the lock 11 may be achieved since the user may introduce the securing part 15 in any desired orientation with a full functionality.

However, the association of the occupancy states (C) and (D) with the respective combinations of detection signals is in particular only unambiguous when the portable lock 11 is not part of a lock system comprising further securing parts. Thus, the respective combinations of detection signals of the sensors 17 and 18 could also be generated when a further securing part 43 configured as a bolt is introduced into a respective one of the introduction openings 14 and 16, wherein other control processes may then possibly be provided or be sensible (cf. also FIGS. 5 and 7).

The portable lock 11 shown in FIG. 3 again comprises two sensors 17 and 18, wherein they are both arranged along the introduction opening 14, but at different introduction depths, while no sensor is provided for detecting a securing part 15 introduced into the introduction opening 16. This arrangement of the sensors 17 and 18 also generally allows the generation of four different combinations of detection signals.

In the occupancy state (A), the securing part 15 is completely introduced into the lock body 13 and may thus be locked thereto, wherein the long limb 33 is introduced into the introduction opening 14 and the short limb 35 is introduced into the introduction opening 16. Due to the detection of the securing part 15, both the sensor 17 and the sensor 18 generate a positive detection signal that may be associated with the securing part 15 that is introduced completely and with the long limb 33 into the introduction opening 14.

In the occupancy state (B), the securing part 15 is again completely introduced into the lock body 13, but it is oriented such that the long limb 33 is introduced into the introduction opening 16 and the short limb 35 is introduced into the introduction opening 14. Consequently, the sensor 17 transmits a positive detection signal and the sensor 18 transmits a negative detection signal. Thus, the occupancy state (B) may indeed be distinguished from the occupancy state (A), but the generated combination of the detection signals of the sensors 17 and 18 corresponds to that of the occupancy state (D).

In this occupancy state (D), the securing part 15 is only partly introduced into the lock body 13, wherein the long limb 33 is partly introduced into the introduction opening 14, while the short limb 35 is released from the lock body 13. Accordingly, the sensor 17 also transmits a positive detection signal here and the sensor 18 transmits a negative detection signal. It is therefore not possible to distinguish between the occupancy states (B) and (D) on the basis of the generated combinations of detection signals.

The generated combinations of detection signals of the occupancy states (C) and (E) also do not differ from one another. In the occupancy state (C), the securing part 15 is partly introduced into the lock body 13, wherein the long limb 33 is partly introduced into the introduction opening 16, while the short limb 35 is released from the introduction opening 14. Since no sensors are arranged at the introduction opening 16, only negative detection signals of the sensors 17 and 18 are transmitted. In the occupancy state (E), the securing part 15 is completely released from the lock body 13 such that both sensors 17 and 18 again trigger negative detection signals.

Consequently, such an arrangement of the sensors 17 and 18 may then allow as clear as possible an information acquisition when the flexibility of the user is restricted with respect to the possible orientation of the securing part 15. In particular if the long limb 33 may only be introduced into the introduction opening 14 by a mechanical coding, the occupancy states (A), (D), and (E) that are then possible may be unambiguously distinguished from one another and the information obtained therefrom may be further processed and may, for example, be used to control the locking device 23.

Such a restriction may, for example, take place by forming the introduction openings 14 and 16 with different diameters such that the long limb 33 may only be introduced into an introduction opening 14 formed with a larger diameter. In this respect, the short limb 35 may have a smaller cross-sectional diameter such that it may also be introduced into the introduction opening 16 and the securing part 15 may thus only be inserted in the desired orientation. Furthermore, due to the forming of the introduction openings 14 and 16 with different diameters, the correct orientation of the securing part 15 may be easily recognized by the user.

In addition to this possibly unwanted restriction of the flexibility of the user, in such an arrangement of the sensors 17 and 18, only three of the four combinations of detection signals that are possible in principle may further be distinguished or may be generated on the introduction of the securing part 15. To be able to achieve a full usability of the sensors 17 and 18, the arrangement of the sensors 17 and 18 in the lock body 13 of the portable lock 11 shown in FIG. 1 may therefore be provided.

FIGS. 4 and 5 show a lock system having a portable lock 11 that comprises three sensors 17, 18, and 19, wherein the sensors 17 and 19 are associated with the introduction opening 14 and the sensor 18 is associated with the introduction opening 16. Thus, eight different combinations of detection signals may generally be generated by the sensors 17, 18, and 19. The arrangement of two sensors 17 and 19 at the introduction opening 14 and one sensor 18 at the introduction opening 16 is in this respect merely exemplary and another arrangement, in particular the reverse arrangement, may also be provided. In addition to the securing part 15 that is configured as a U hoop and that has a long limb 33 and a short limb 35, the lock system comprises two further securing parts 43 that are configured as bolts. Possible occupancy states of the lock body 13 with the securing part 15 configured as a U hoop are shown in FIG. 4; possible occupancy states with the securing parts 43 configured as bolts are shown in FIG. 5.

In the occupancy state (A), the securing part 15 is completely introduced into the lock body 13 and may be locked thereto. In this respect, the long limb 33 is introduced into the introduction opening 14 and the short limb 35 is introduced into the introduction opening 16. Accordingly, all the sensors 17, 18, and 19 generate a positive detection signal. This combination of the detection signals may be unambiguously associated with the occupancy state (A) with respect to the introduction of the securing part 15 such that information on both the introduction depth and the orientation of the securing part 15 may be obtained directly therefrom.

In the occupancy state (B), the securing part 15 is also completely introduced into the lock body 13, but differs in its orientation from the occupancy state (A) such that the long limb 33 is introduced into the introduction opening 16 and the short limb 35 is introduced into the introduction opening 14. The combination of positive detection signals of the sensors 17 and 18 with a negative detection signal of the sensor 19 is consequently associated with this occupancy state (B). Due to this arrangement of three sensors 17, 18, and 19, the orientation of a completely introduced securing part 15 may consequently be recognized in that the occupancy states (A) and (B) are associated with different combinations of detection signals.

In the occupancy state (C), the securing part 15 is partly introduced into the lock body 13, wherein the long limb 33 partly remains in the introduction opening 16, while the short limb 35 is released from the introduction opening 14. A positive signal of the sensor 18 and negative signals of the sensors 17 and 19 are generated for this occupancy state (C).

In the occupancy state (D), the securing part 15 is partly introduced into the lock body 13 in the reverse orientation such that the long limb 33 partly remains in the introduction opening 14, while the short limb 35 is released from the introduction opening 16. This occupancy state (D) is characterized by a positive signal of the sensor 17 and negative signals of the sensors 18 and 19. Thus, the combinations of the detection signals for the occupancy states (C) and (D) also differ such that both the introduction depth and the orientation of the securing part 15 may unambiguously result from the combinations of the detection signals and this information may be further processed. Based on the determined information, the latches 25 and 26 may, for example, be guided into a locked position for locking the securing part 15 in the occupancy states (A) and (B). On a recognition of the occupancy states (C) and (D), the respective latch 26 or 25 that is associated with the introduction opening 14 or 16, into which the long limb 33 is introduced, may further be brought into an engagement position such that the securing part 15 may be pivoted about the long limb 33.

In the occupancy state (E) of FIG. 4, the securing part 15 is completely released from the lock body 13 and all the sensors 17, 18, and 19 generate negative detection signals. This occupancy state (E) may also be unambiguously associated with the securing part 15 completely released from the lock body 13.

With respect to a sole use of the securing part 15, the complete information on the depth of the introduction and on the orientation of the introduced securing part 15 may thus be determined by means of the sensors 17, 18, 19. In contrast to the arrangement of two sensors 17 and 18 shown in FIG. 1, the orientation of a completely introduced securing part 15 may also be directly detected in the occupancy states (A) and (B).

Nevertheless, it is also generally possible in the embodiment in accordance with FIGS. 4 and 5 to predefine, by mechanical coding, a single possible orientation for the introduction of the securing part 15, which is configured as a U hoop, into the lock body 13.

FIG. 5 shows further occupancy states of the lock body 13 that result from the introduction of two further securing parts 43 that belong to the lock system and that are configured as bolts.

In the occupancy state (F), both securing parts 43 are completely introduced into one of the introduction openings 14 and 16 each. All the sensors 17, 18, and 19 detect the respective securing part 43 and generate a positive detection signal. This combination of the detection signals in the occupancy state (F) therefore does not differ from the combination of the occupancy state (A) in which the securing part 15 is completely introduced. However, the indistinguishability of the occupancy states (A) and (F) is usually unproblematic in practice since the securing parts 15 and 43 are completely introduced in both occupancy states such that a locking or an unlocking of the securing parts 15 or 43 is usually provided. Since the sensors 18 and 19 further transmit changed signals on a transfer of the securing part 15 from the occupancy state (A) to the occupancy state (D), while only the signals of the sensors associated with the respective introduction opening 14 or 16 change on a removal of one of the securing parts 43, the transfer of the securing part 15 to the occupancy state (D) may also be recognized by evaluating the sequence of different combinations of generated detection signals and the control may be adapted accordingly.

In the occupancy state (G), the securing part 43 associated with the introduction opening 14 is released from the lock body 13, while the other securing part 43 is completely introduced into the introduction opening 16. Accordingly, the sensor 18 generates a positive detection signal, while the sensors 17 and 19 each transmit a negative detection signal. This combination of the detection signals also does not differ from the combination of occupancy state (C) such that no distinction may be made between the two occupancy states in this arrangement of the sensors. However, since in each case either the long limb 33 of the securing part 15 or the securing part 43 is also to be locked to or held at the lock body 13 in these occupancy states, the flexibility of the usability of the lock is also only slightly restricted by this agreement of the combinations of the detection signals.

The indistinguishability of the combinations or of the occupancy states (C) and (G) may only prove to be problematic when the engagement position of the latch 26 associated with the introduction opening 16 for pivotally holding the long limb 33 in the occupancy state (C) is to differ from the locked position such that different positions of the latch 26 are to be permitted in the occupancy states (C) and (G). This may, for example, be counteracted by a design of the notch 37 in the lower region of the limb 33 that is adapted to this circumstance.

In the occupancy state (H), a securing part 43 is completely introduced into the introduction opening 14, while no securing part 43 is located in the introduction opening 16. The sensors 17 and 19 consequently generate positive detection signals, while the sensor 18 transmits a negative detection signal. In this orientation of the two securing parts 43 or their introduction, an unambiguous association may take place since such a combination of the detection signals is not generated in any other occupancy state and in particular not on an introduction of the securing part 15.

In the occupancy state (E) of FIG. 5, both securing parts 43 are again completely released from the lock body 13 such that all the sensors 17, 18, and 19 transmit a negative detection signal.

Due to this arrangement of three sensors 17, 18, and 19, a plurality of the possible occupancy states may thus already be unambiguously recognized such that a flexible and adapted control of the locking device 23 may be made possible. Six of the eight combinations of detection signals that are possible in principle are generated by the two securing parts 15 and 43, wherein the unused combination of a positive signal of sensor 19 in the case of negative signals of the sensors 17 and 18 could, for example, be generated by an adapter 45 introduced into the introduction opening 14 (cf. FIG. 8) or in that a securing part in the completely introduced state has a recess or the like in the region of sensors 17 and 18 such that only the sensor 19, but not the sensors 17 and 18, generates a positive detection signal. The remaining combination of two positive signals of the sensors 17 and 18 in the case of a negative signal of the sensor 19 could further be produced by the introduction of two short bolts or a U hoop that is formed with two limbs that are of equal length and that are each short.

FIGS. 6 to 8 show possible occupancy states of a lock body 13 that, in accordance with FIG. 1, comprises four sensors 17, 18, 19, and 20, wherein the sensors 17 and 19 are associated with the introduction opening 14 and the sensors 18 and 20 are associated with the introduction opening 16. Due to this arrangement of four sensors 17, 18, 19, and 20, a total of sixteen distinguishable combinations of detection signals may thus be produced overall. The portable lock 11 is furthermore part of a lock system that comprises the securing part 15 that is configured as a U hoop; two further securing parts 43 that are configured as bolts; a third securing part 47 that is likewise configured as a U hoop; and an adapter 45. The securing part 47 is configured such that it may be connected to the adapter 45 and may only be locked to the lock body 13 in the connected state. This may, for example, be the case when the cross-sectional diameter of the short limb 35 of the securing part 47, which is connected to the adapter 45, is too small to be able to be securely locked to the lock body 13 without the adapter 45.

FIG. 6 in this respect shows possible occupancy states of the lock body 13 with the securing part 15, FIG. 7 shows possible occupancy states with the securing parts 43 configured as bolts, and FIG. 8 shows possible occupancy states with the securing part 47 and the adapter 45.

In the occupancy state (A) of FIG. 6, the securing part 15 is completely introduced into the lock body 13, wherein the long limb 33 is introduced into the introduction opening 14 and the short limb 35 is introduced into the introduction opening 16. For this occupancy state (A), the sensors 17, 18, and 19 each generate a positive detection signal and sensor 20 generates a negative detection signal.

In the occupancy state (B), the securing part 15 is completely introduced into the lock body 13 in the reverse orientation such that the long limb 33 is introduced into the introduction opening 16 and the short limb 35 is introduced into the introduction opening 14. For this occupancy state, sensors 17, 18, and 20 generate a positive detection signal and the sensor 19 generates a negative detection signal.

Both the occupancy state (A) and the occupancy state (B) may be unambiguously associated with the completely introduced securing part 15 and its orientation such that this information may be seen from the combinations of the detection signals.

In the occupancy states (C) and (D), the securing part 15 is in each case partly introduced into the lock body 13, wherein the two occupancy states differ with respect to the orientation of the securing part 15. Due to the introduction of the long limb 33 into the introduction opening 16 in the occupancy state (C), the sensor 18 generates a positive detection signal, while the sensors 17, 19, and 20 trigger negative detection signals. In the reverse orientation of the occupancy state (D), the sensor 17 generates a positive detection signal, while the sensors 18, 19, and 20 transmit negative signals. These two occupancy states may consequently also be distinguished from one another based on the respective combination of detection signals and the information on the introduction depth and the orientation of the securing part 15 may be determined from the combination. This information may, for example, be used in the control of the locking device 23 to move either the latch 25 or the latch 26 into an engagement position depending on the orientation of the securing part 15 such that said latch 25 or latch 26 engages into the notch 37 in the lower region of the long limb 33 and the securing part 15 may be pivoted about the long limb 33.

In the occupancy state (E) of FIG. 6, the securing part 15 is completely released from the lock body 13 such that all the sensors 17, 18, 19, and 20 transmit negative detection signals.

Since the combinations of the detection signals of all the occupancy states of the lock body 13 with the securing part 15 differ from one another, these combinations may be unambiguously associated with the respective occupancy state. Thus, the information on the introduction depth and the orientation of the securing part 15 is available at all times (in particular also without an evaluation of a sequence of different combinations of detection signals) and this information may be processed or may be transmitted to the user and may be flexibly used for the control in particular of the locking device 23.

In the occupancy state (F) of FIG. 7, two securing parts 43 configured as bolts are completely introduced into the introduction openings 14 and 16. Accordingly, all the sensors 17, 18, 19, and 20 generate positive detection signals. This combination of the detection signals may also be unambiguously associated with the complete introduction of the two securing parts 43 such that the occupancy state (F) may likewise be identified.

In the occupancy states (G) and (H), a respective one of the securing parts 43 is completely introduced into one of the introduction openings 14 or 16, while the respective other securing part 43 is released from the lock body 13. Accordingly, the sensors that are arranged at the respective introduction opening 14 or 16 into which a securing part 43 is introduced generate positive detection signals, while the respective other sensors transmit negative detection signals. These combinations of detection signals may also be unambiguously associated with the respective occupancy states (G) or (H) such that it is also possible to detect when only one securing part 43 is introduced into the lock body 13 and to determine the associated introduction opening 14 or 16. The recognition of only one introduced securing part 43 may, for example, be used to notify the user of the necessity of the introduction of the second securing part 43 or of a closure for the open introduction opening 14 or 16. Due to such a notification or the requirement for a complete closing of the lock body 13, it may be prevented that the inner space of the lock body 13 is damaged by incoming dirt or inflowing liquid and break-open attempts may be counteracted by an unclosed introduction opening 14 or 16.

In the occupancy state (E) of FIG. 7, both securing parts 43 are released from the lock body 13 such that all the sensors 17, 18, 19, and 20 transmit negative detection signals.

FIG. 8 shows possible occupancy states of the lock body 13 with a securing part 47 that may be connected to an adapter 45 that may be introduced into the introduction openings 14 and 16. In this respect, the short limb 35 of the securing part 47 configured as a U hoop is configured such that its introduction into one of the introduction openings 14 or 16 may not be detected by the sensors 17 or 18 and such that said short limb 35 may only be locked to the lock body 13 in conjunction with the adapter 45. This may, for example, be the case if the short limb 35 has too small a cross-sectional diameter to be able to be securely locked to the lock body 13 without the adapter 45.

As may be seen from the occupancy state (M), the adapter 45 is further configured such that, when it is completely introduced into one of the introduction openings 14 or 16, it is detected by the sensor 19 or 20 that is in each case arranged at the bottom of the introduction opening 14 or 16. Accordingly, in the occupancy state (M) in which the adapter 45 is introduced into the introduction opening 14, only the sensor 19 generates a positive detection signal, while the sensors 17, 18, and 20 transmit negative detection signals. This combination of the detection signals may consequently be unambiguously associated with the adapter 45 introduced into the introduction opening 14. The unambiguous association of a combination of detection signals, in which only the sensor 20 transmits a positive signal, with an adapter 45 introduced into the introduction opening 16 accordingly results.

The design of the adapter 45 such that the adapter 45 triggers the generation of a positive detection signal of the sensor 19 or 20, which is in each case arranged at the bottom of the introduction opening 14 or 16, when the adapter 45 is introduced into one of the introduction openings 14 or 16 may, for example, be achieved in that the adapter 45 is provided with an elevated portion or with a larger diameter at its lower end (in the region of the sensor 19 or 20) than at its upper region (in the region of the sensor 17 or 18). The occupancy states in which the securing part 47 is connected to the adapter 45 and is introduced into the lock body 13 may also be unambiguously determined by the adapter 45.

In the occupancy state (I) of FIG. 8, the securing part 47 is completely introduced into the lock body 13, wherein the long limb 33 is introduced into the introduction opening 14, while the short limb 35 is connected to the adapter 45 and is introduced into the introduction opening 16. For this occupancy state (I), the sensors 17, 19, and 20 generate positive detection signals, while the sensor 19 transmits a negative signal.

In a reverse orientation of the securing part 47 and the adapter 45 in the occupancy state (J), the sensors 18, 19, and 20 generate a positive signal, while the sensor 17 transmits a negative signal. The combinations of the detection signals in the occupancy states (I) and (J) consequently differ from those of other possible occupancy states of the lock body 13 and may accordingly each be unambiguously associated with a completely introduced securing part 47, which is connected to the adapter 45, and with its orientation.

In the occupancy states (K) and (L), the securing part 47 is in each case partly introduced into the lock body 13 such that the long limb 33 partly remains in the respective introduction opening 16 or 14, while the short limb 35 is released from the associated introduction opening 14 or 16. The adapter 45, in contrast, is completely located in the associated introduction opening 14 or 16. In the occupancy state (K), the sensor 18 and the sensor 19 generate positive signals, while the sensors 17 and 20 transmit negative signals. In the occupancy state (L), in contrast, the sensors 17 and 20 transmit positive signals, while negative signals are transmitted by the sensors 18 and 19. Thus, the combinations of detection signals of the occupancy states (K) and (L) also differ from one another as well as from the combinations of other possible occupancy states of the lock body 13 such that these occupancy states (K) and (L) may also be unambiguously associated.

In the lock system shown, fourteen of the sixteen possible combinations of detection signals of the sensors 17, 18, 19, and 20 are used to detect occupancy states. The remaining combination of positive detection signals of the sensors 19 and 20 in the case of negative detection signals of the sensors 17 and 18 could, for example, be generated by two adapters 45 that are each introduced into one of introduction openings 14 and 16. Due to such adapters 45, a further U hoop, in which both limbs 33 and 35 have too small a cross-sectional diameter to be locked to the lock body 13, may, for example, likewise be secured in the lock body 13. Furthermore, the combination of positive detection signals of the sensors 17 and 18 in the case of negative detection signals of the sensors 19 and 20 could be produced by a U hoop having two limbs that are of equal length and that are each short, or by the introduction of two short bolts.

A variety of information may consequently be obtained, processed, and provided to a user by such a portable lock 11 and in particular by the arrangement of four sensors 17, 18, 19, and 20, as shown in FIGS. 6 to 8. Due to this information, a flexible use of the portable lock 11 may be achieved with respect to the selection of the securing parts 15, 43, and 47, and in particular with respect to the control of the locking device 23. The flexible usability of the portable lock 11 may furthermore be increased further if the lock system comprises one or more adapters 45 such that a wide variety of securing parts 15, 43, and 47 may be introduced into and locked to the lock body 13. Thus, a user may arbitrarily select the securing part 15, 43, or 47 that is suitable for a specific application in each case.

In addition, it must be remarked that it is also generally possible without the adapter 45 that the upper sensors 17, 18 do not generate a detection signal when a securing part is completely introduced, while one or both of the lower sensors 19, 20 generate a detection signal. For example, such a securing part, as explained for the adapter 45, may have a recess or the like in the region of the upper sensors 17 and 18. A corresponding coding may take place with another type of sensor 17, 18, 19, 20 such as a magnetic switch.

It must further be remarked that an adapter 45 of the explained type also enables an adaptation of a securing part 47 in a lock without sensors 17, 18, 19, 20 (in particular in a portable lock with a purely mechanical locking or likewise with an electromechanical locking).

REFERENCE NUMERAL LIST

11 portable lock
13 lock body
14 introduction opening
15 securing part
16 introduction opening
17 first sensor
18 second sensor
19 third sensor
20 fourth sensor
21 evaluation and control circuit
23 locking device
25 first latch
26 second latch
27 radio module
29 GPS receiver
31 alarm device
33 long limb of a U hoop
35 short limb of a U hoop
36 indentation
37 notch
43 further securing part
45 adapter
47 third securing part

The invention claimed is:

1. A portable lock, comprising a lock body and at least one securing part wherein the at least one securing part is sized and configured to be selectively locked to the lock body or released from the lock body, and wherein the lock body comprises:

at least one introduction opening for introducing the at least one securing part into the lock body;

at least two sensors for detecting the securing part introduced into the lock body, wherein each of the at least two sensors is configured and arranged for a direct sensing of the securing part and for generating corresponding detection signals;

an evaluation and control circuit for determining a current occupancy state of the lock body in dependence on the generated detection signals, wherein the evaluation and control circuit is configured to associate different combinations of generated detection signals with different occupancy states of the lock body; and an electromechanical locking device that has at least one electrically drivable latch for locking the at least one securing part in the at least one introduction opening, wherein the evaluation and control circuit is configured to control the locking device;

wherein the lock body has at least two introduction openings, wherein the at least one securing part is sized and configured to be introduced in two different orientations into the at least two introduction openings, and wherein respective information on the orientation of the at least one securing part is stored in the evaluation and control circuit for the different occupancy states of the lock body;

wherein the securing part is a U-hoop that has a long limb and a short limb and that may be completely removed from the lock body, wherein the orientation is defined by the respective introduction opening into which the long limb is introduced.

2. A portable lock in accordance with claim 1, wherein the lock body has three or four sensors.

3. A portable lock in accordance with claim 1, wherein two of the at least two sensors are associated with the same introduction opening of the lock body.

4. A portable lock in accordance with claim 3, wherein the at least two sensors associated with the same introduction opening of the lock body, are arranged along the introduction opening at different introduction depths.

5. A portable lock in accordance with claim 1, wherein the lock body has two introduction openings, wherein at least one of the at least two sensors is associated with one of the two introduction openings and at least one other of the at least two sensors is associated with the other of the two introduction openings.

6. A portable lock in accordance with claim 5, wherein the at least two sensors comprise at least four sensors, wherein two sensors of the at least four sensors are associated with the one of the two introduction openings and two other sensors of the at least four sensors are associated with the other of the two introduction openings.

7. A portable lock in accordance with claim 1, wherein the at least two sensors are securing part sensors configured to detect the securing part, wherein each of the securing part sensors are configured to distinguish at least between a detection state and a non-detection state and to generate a positive or a negative detection signal accordingly.

8. A portable lock in accordance with claim 1, wherein the respective sensor has an electromechanical contact switch, a capacitive proximity switch, a magnetic switch, an optoelectronic interruption switch, or an optoelectronic proximity switch.

9. A portable lock in accordance with claim 1, wherein respective information on a corresponding securing part is stored in the evaluation and control circuit for the different occupancy states of the lock body.

10. A portable lock in accordance with claim 1, wherein the evaluation and control circuit is configured to associate at least four different combinations of generated detection signals with different occupancy states of the lock body.

11. A portable lock in accordance claim 1, wherein respective information on permitted positions of the at least one latch is stored in the evaluation and control circuit for the different occupancy states of the lock body.

12. A portable lock in accordance with claim 1, wherein the locking device has two latches that are driven independently of one another.

13. A portable lock in accordance with claim 1, wherein the evaluation and control device is configured to control the locking device in dependence on the determined current occupancy state of the lock body.

14. A portable lock in accordance with claim 1, wherein the lock body has a radio module that is connected to the evaluation and control circuit.

15. A portable lock in accordance with claim 14, wherein the radio module is configured to transmit the current occupancy state of the lock body as a radio signal and/or to receive a control command for the locking device by radio.

16. A portable lock in accordance with claim 14, wherein the lock body has a GPS receiver to determine a current position of the lock body, wherein the radio module is configured to transmit the determined current position as a radio signal.

17. A portable lock in accordance with claim 14, wherein the lock body has an alarm device that comprises at least one of: a circuit monitoring; a tamper contact; the at least two sensors; an acceleration sensor; and/or a vibration sensor.

18. A portable lock in accordance with claim 17, wherein the radio module is configured to transmit an alarm signal as a radio signal and/or to receive a control command for the alarm device by radio.

19. A portable lock in accordance with claim 1, wherein the lock body has an electrical energy source for the energy supply of further components of the portable lock, wherein the evaluation and control circuit is configured to control the energy supply of at least one of the further components in dependence on the determined current occupancy state of the lock body.

20. A portable lock, comprising a lock body and at least one securing part wherein the at least one securing part is sized and configured to be selectively locked to the lock body or released from the lock body, and wherein the lock body comprises:

at least two introduction openings for introducing the at least one securing part into the lock body; wherein the at least one securing part has a first end and a second end, wherein each end is introduced into a respective introduction opening when the at least one securing part is locked to the lock body;

at least two sensors for detecting the securing part introduced into the lock body, wherein each of the at least two sensors is configured and arranged for a direct sensing of the securing part and for generating corresponding detection signals;

an evaluation and control circuit for determining a current occupancy state of the lock body in dependence on the generated detection signals, wherein the evaluation and control circuit is configured to associate different combinations of generated detection signals with different occupancy states of the lock body; and an electromechanical locking device that has at least one electrically drivable latch for locking the at least one securing part in the at least one introduction opening, wherein the evaluation and control circuit is configured to control the locking device; and at least one further securing part, wherein the at least one securing part and the at least one further securing part are configured to trigger the generation of different combinations of detection signals when either the at least one securing part or the at least one further securing part is introduced into the at least one introduction opening of the lock body; wherein the at least one further securing part has a first end and a second end, wherein each end is introduced into a respective introduction opening when the at least one further securing part is locked to the lock body;

wherein the at least one securing part and the at least one further securing part both are completely removable from the lock body, wherein the at least one securing part can be locked to the lock body when the at least one further securing part is completely removed from the lock body, and wherein the at least one further securing part can be locked to the lock body when the at least one securing part is completely removed from the lock body.

21. A lock system in accordance with claim 20, wherein the evaluation and control circuit is configured to associate the different combinations of detection signals with a respective one of the at least one securing part and the at least one further securing part.

22. A lock system in accordance with claim 20, wherein the lock system comprises an adapter that is sized and configured to be introduced into the at least one introduction opening.

23. A lock system in accordance with claim 22, wherein the adapter is configured to effect a generation of a predetermined combination of detection signals when the adapter is introduced into the at least one introduction opening.

24. A lock system in accordance with claim 22 wherein the further securing part or a third securing part of the lock system is sized and configured to be selectively locked to the lock body when the adapter is inserted into the at least one introduction opening.

25. A lock system comprising:

a portable lock, comprising a lock body and at least one securing part wherein the at least one securing part configured to be selectively locked to the lock body or released from the lock body, and wherein the lock body comprises:

at least one introduction opening for introducing the at least one securing part into the lock body;

at least two sensors for detecting the securing part introduced into the lock body and for generating corresponding detection signals;

an evaluation and control circuit for determining a current occupancy state of the lock body in dependence on the generated detection signals, wherein the evaluation and control circuit is configured to associate different combinations of generated detection signals with different occupancy states of the lock body; and an electromechanical locking device that has at least one electrically drivable latch for locking the at least one securing part in the at least one introduction opening, wherein the evaluation and control circuit is configured to control the locking device; and at least one further securing part, wherein the at least one securing part and the at least one further securing part are configured to trigger the generation of different combinations of detection signals when either the at least one securing part or the further securing part is introduced into the at least one introduction opening of the lock body; and an adapter that is sized and configured to be introduced into the at least one introduction opening;

wherein the adapter is configured to effect a generation of a predetermined combination of detection signals when the adapter is introduced into the at least one introduction opening;

wherein the predetermined combination differs from the combinations of detection signals triggered by the at least one securing part and/or the at least one further securing part.

* * * * *